United States Patent
Inamura et al.

(10) Patent No.: US 7,568,119 B2
(45) Date of Patent: Jul. 28, 2009

(54) STORAGE CONTROL DEVICE AND STORAGE CONTROL DEVICE PATH SWITCHING METHOD

(75) Inventors: Akihiro Inamura, Hadano (JP); Xiaoming Jiang, Odawara (JP)

(73) Assignee: Hitachi, Ltd., Tokyo (JP)

( * ) Notice: Subject to any disclaimer, the term of this patent is extended or adjusted under 35 U.S.C. 154(b) by 704 days.

(21) Appl. No.: 11/212,845

(22) Filed: Aug. 29, 2005

(65) Prior Publication Data
US 2007/0002847 A1  Jan. 4, 2007

(30) Foreign Application Priority Data
Jun. 30, 2005  (JP)  .............................. 2005-191600

(51) Int. Cl.
*G06F 11/00* (2006.01)
(52) U.S. Cl. .............................................. 714/4; 714/6
(58) Field of Classification Search ...................... 714/4
See application file for complete search history.

(56) References Cited

U.S. PATENT DOCUMENTS

2004/0205288 A1* 10/2004 Ghaffari et al. ............. 711/100
2006/0090094 A1* 4/2006 McDonnell et al. ............ 714/4

FOREIGN PATENT DOCUMENTS

JP  2003-108315  4/2003

\* cited by examiner

*Primary Examiner*—Scott T Baderman
*Assistant Examiner*—Jigar Patel
(74) *Attorney, Agent, or Firm*—Brundidge & Stanger, P.C.

(57) ABSTRACT

The invention verifies the validity of instructions transmitted between controllers without complicating the structure of the electrical connection between controllers. The initial setup detection unit detects whether an initial setup of the lower communications network has been completed. When a fault in the path to the storage unit has been detected by the fault detection unit, the switching request output unit outputs a switching request signal to the switching permission unit. When the preparation status detection unit is aware that the lower communications network has completed initial setup, the preparation status detection unit outputs the preparation complete signal to the switching permission unit. When both the switching request signal and the preparation complete signal are input, the switching permission unit outputs the switching signal to the path switching unit. The path switching unit switches the path in accordance with the signal from the switching permission unit.

14 Claims, 16 Drawing Sheets

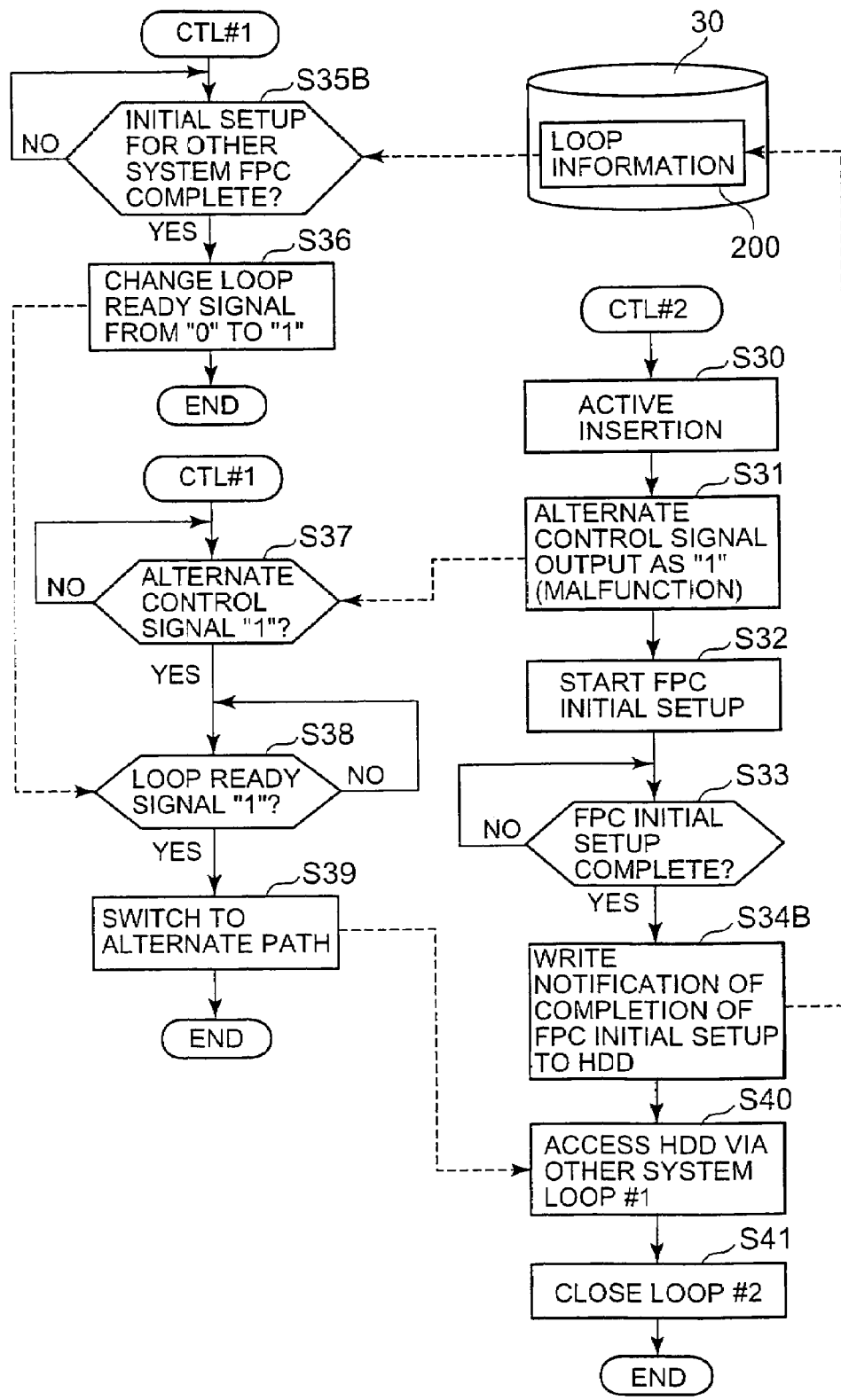

STORAGE CONTROL DEVICE AND STORAGE CONTROL DEVICE PATH SWITCHING METHOD

CROSS-REFERENCE TO RELATED APPLICATIONS

This application relates to and claims priority from Japanese Patent Application No. 2005-191600 filed on Jun. 30, 2005, the entire disclosure of which is incorporated herein by reference.

BACKGROUND OF THE INVENTION

1. Field of the Invention

The present invention relates to a storage control device and a storage control device path switching method.

2. Description of the Related Art

In a variety of organizations such as government, public offices, local government, enterprise, and education and the like, data is managed using comparatively large-scale storage control devices for the handling of large volumes of various types of data. These storage control devices comprise storage areas having redundancy through the use of redundant information (RAID: Redundant Array of Independent Disks), and store data in the storage areas (Japanese Patent Application Laid-open No. 2003-108315). In the conventional technology described in this document, by switching access paths from the host in a stepped manner from an old storage control device to a new storage control device, data can be migrated between devices without halting access from the host.

Ease of access to data is required, and good availability (reliability), are both required of storage control devices in order to manage large amounts of data. Thus, by employing a redundant storage structure, duplication of access paths to the storage device, and duplication of the controllers, realization of good availability is possible.

However, even if access paths and controllers are duplicated, unless control signals connecting the controllers are duplicated, appropriate response will not be possible in some cases. For example, if a fault occurs in a control signal line connecting the controllers, the appropriate response to the fault in the control signal line may not be possible. However, if duplication is extended to the control signal lines, the number of control signal lines is doubled, complicating the structure of electrical connections between the controllers, and inviting an increase in size of the device.

In particular, if a fault occurs in the control signal for inducing switching of the storage device access path from the primary path to the alternate path, the path may be switched before preparations are completed for switching the controller to be the switching source.

SUMMARY OF THE INVENTION

Therefore, an object of the present invention is to provide a storage control device and a storage control device path switching method to improve reliability. A further object of the present invention is to provide a storage control device and a storage control device path switching method to permit improved reliability without complicating the structure of connections between controllers. A further object of the present invention is to provide a storage control device and a storage control device path switching method to permit switching of storage device access paths without complicating the structure of connections between controllers. Further objects of the present invention will become clear from the embodiment described below.

As described below, the storage control device according to the present invention to solve the afore-mentioned problems is connected to the host device and each of a plurality of storage devices, and when, in a storage control device duplicated with a plurality of controllers, a control instruction is issued from one of the controllers to instruct execution of the prescribed operation, another controller acquires information (execution environment information) related to issuing of the control instruction from the controller issuing the instruction and evaluates whether or not execution is appropriate prior to executing the prescribed operation. If execution is evaluated as possible, the prescribed operation is executed in accordance with the control instruction.

The storage control device according to one aspect of the present invention is connected to the host device and each of a plurality of storage devices, and has a plurality of controllers connected to each storage device via differing lower communications networks. Each controller has an upper communications unit conducting communications with the host device via an upper communications network, a lower communications unit conducting communications with each storage device via a lower communications network, a control unit inputting and outputting data between the storage devices via the lower communications network based on instructions input from the host device via the upper communications network, a switching unit switching the connection destination of the lower communications unit between the lower communications network and the lower communications network of the partner controller, a fault detection unit detecting faults occurring in the lower communications network, a switching request unit outputting a switching request for switching from a lower communications network in which a fault has been detected to a lower communications network of the partner controller when a fault is detected by the fault detection unit, a preparation status detection unit detecting whether or not switching preparations have been completed, and a switching permission unit permitting switching with the switching unit based on a switching request when the preparation status detection unit detects that switching preparations have been completed.

Therefore, for example, the fault detection unit and the switching request unit can also be provided within the control unit. The storage control device is multiplexed with one controller and the other controller, and each controller can access the storage device via independent lower communications networks.

When a fault occurs in one lower communications network, a switching request is output from the switching request unit of one controller (switching source) to the switching permission unit of the other controller (switching request destination). Furthermore, the preparation status detection unit of the other controller detects whether or not switching preparations one controller are complete, and when switching preparations are detected as completed, preparations complete is output to the switching permission unit of the other controller. The switching permission unit verifies that switching preparations are complete, and permits switching of the lower communications network with the switching unit. Therefore, even if one controller switching request unit mistakenly outputs a switching request, the lower communications network is not switched unless switching preparations are complete, thus improving reliability.

In one embodiment, the preparation status detection unit detects whether or not switching preparations are complete in the controller in which a fault is detected. Thus, reliability with 'active line insertion' can be improved. If, for example, a malfunction occurs in the switching request unit of one controller, installing one controller in a storage control device in the operational status may result in immediate output of a switching request from the switching request unit in some cases. However, the lower communications network is not switched until completion of preparations for one controller is verified by the preparation status detection unit, thus improving reliability.

In one embodiment, the preparation status detection unit detects switching preparations as being complete in a controller in which a fault has been detected when initial setup for the lower communications network is completed. Thus, even when one controller in which a fault has occurred in the switching request unit is installed in the storage control device, the lower communications network is not switched until the lower communications unit of one controller completes initial setup, thus improving reliability.

In one embodiment, the controllers are mutually connected via a control communications path, and the preparation status detection unit detects, via the control communications path, whether or not switching preparations have been completed in the controller in which the fault is detected. Thus, a signal line for notifying completion of switching preparations need not be provided between controllers, and the existing control communications path can be used, and reliability of path switching can be improved.

In another embodiment, when switching preparations are complete the controllers write status notification information indicating that switching preparations have been completed to the prescribed storage device of the plurality of storage devices, and the preparation status detection unit, when acquired with the status notification information from the prescribed storage device, detects completion of switching preparations.

In another embodiment, a management computer is further provided connected to the controllers respectively via a management network, and each controller communicates status notification information indicating that switching preparations are complete via the management computer.

The path switching method of the storage control device according to another aspect of the present invention has a plurality of controllers connected to a plurality of storage devices via differing lower communications networks. The path switching method of the storage control device duplicated with a plurality of controllers includes a step of detecting whether or not a fault has occurred in a lower communications network; a step of communicating, when a fault has been detected, from a switching source controller to a switching destination controller a switching request to induce switching from the lower communications network, in which the fault has been detected, to the lower communications network of the switching destination controller; a step of detecting whether or not switching preparations are complete in the switching source controller, and, when completion of switching preparations is detected, communicating the completion of preparations to the switching destination controller; and a step of inducing the lower communications network used by the switching source controller to switch from the lower communications network, in which the fault is detected, to the lower communications network of the switching destination controller, when both the switching request and preparation completion are communicated.

The storage control device according to another aspect of the present invention has a plurality of controllers connected to a plurality of storage devices via differing primary loops.

Each primary loop is a storage control device being mutually partnered with an alternate loop in which (1) each controller has an upper communications unit conducting communications with the host device, a lower communications unit conducting communications with each storage device via a primary loop, a control unit inputting and outputting data with each storage device via the lower communications unit based on instructions input from the host device via the upper communications unit, a switching unit switching the connection destination of the lower communications unit between the primary loop and the alternate loop, a fault detection unit detecting faults occurring in the primary loop, a switching request signal output unit outputting a switching request signal for inducing switching from the primary loop in which a fault is detected to the alternate loop, when a fault is detected by the fault detection unit, (2) each controller has, furthermore, a preparation status detection unit detecting, via a control communications path mutually connecting the control unit of each controller, whether or not the lower communications unit of the partner controller has completed initial setup, and outputting a preparations complete signal when initial setup has been completed; and an AND gate connected to the preparation status detection unit and the switching request signal output unit of the partner controller on the input side, and to the switching unit on the output side, and (3), the AND gate outputs a switching signal to the switching unit when a preparations complete signal and a switching request signal are input.

In one embodiment, the switching request signal output unit normally sets the signal level of the switching request signal to low level, and when a fault is detected, changes the signal level of the switching request signal from low level to high level. The preparation status detection unit normally sets the signal level of the preparations complete signal to low level, and when initial setup is completed, changes the signal level of the preparations complete signal from low level to high level. When the preparations complete signal and the switching request signal both change from low level to high level, the AND gate outputs the switching signal to the switching unit.

All or part of the means, functions and steps of the present invention may be configured as a computer program executed by a computer system. When all or part of the configuration of the present invention is comprised of a computer program, this computer program can, for example, be fixed and distributed on various types of storage media, or sent via a communications network.

BRIEF DESCRIPTION OF THE DRAWINGS

FIG. 16 is a flowchart showing path switching processing according to the third embodiment;

DESCRIPTION OF THE PREFERRED EMBODIMENTS

Figure 1:
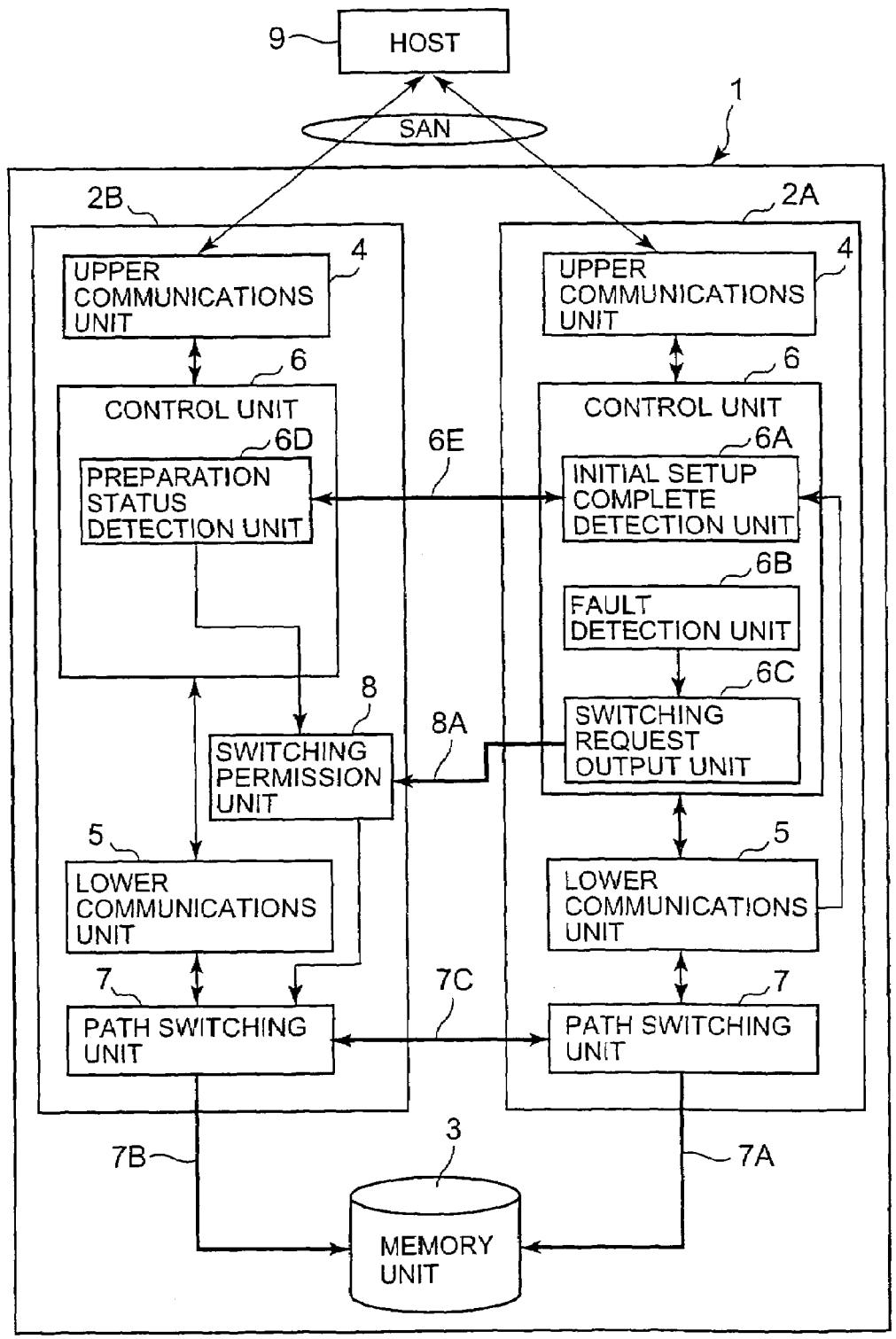
FIG. 1 is a schematic diagram showing the overall outline of the embodiments of the present invention.

FIG. 1 is a schematic diagram showing the overall outline of the embodiments of the present invention. In the present embodiment, as described below, in a storage control device multiplexed with a plurality of controllers, when a control instruction (switching request signal) instructing execution of the prescribed operation is output from one controller, the other controller verifies whether or not the execution environment (completion of initial setup for the lower communications unit) for the prescribed operation is ready in the other controller prior to conducting the prescribed operation (loop switching), and executes the prescribed operation when the execution environment in one controller has been verified. In other words, in the present embodiment, when a control instruction is issued from one controller to the other controller, the validity of that control instruction is evaluated based on other information related to the control instruction, and the control instruction is executed.

The storage control device 1 shown in FIG. 1 is connected to the host device 9 (hereafter referred to as 'the host') via, for example, an upper communications network such as a SAN (Storage Area Network) and the like, and a volume provided to the host 9.

The storage control device 1 has a plurality of controllers 2A and 2B, and a storage unit 3. The controllers 2A and 2B can independently access the storage unit 3, and input and output data. Furthermore, the controllers 2A and 2B are related for mutual backup, so that when one controller is halted due to a fault or for maintenance and the like, the other controller can process access requests from the host 9.

The controllers 2A and 2B have the same configuration, and have an upper communications unit 4, a lower communications network 5, a control unit 6, a path switching unit 7, and a switching permission unit 8. In FIG. 1, only the controller 2B is shown as having the switching permission unit 8 for reasons of simplification of the figure, however, the controller 2A also has a switching permission unit 8 in practice.

The storage unit 3 can be comprised of a plurality of storage devices such as a hard disk drive, a semiconductor memory drive, and an optical disk drive, and the like. A logical volume is created by virtualizing the physical storage areas of these storage devices. The host 9 accesses the logical volume and reads and writes data. The storage unit 3 has at least two I/O ports, each port being connected to the differing paths 7A and 7B. Therefore, the storage unit 3 can be accessed from both paths 7A and 7B.

The upper communications unit 4 is responsible for communications with the host 9. The lower communications network 5 is responsible for communications with the storage unit 3. The upper communications unit 4 is connected to the host 9 via an upper communications network such as a SAN and the like, and conducts data communications in units of blocks based on the Fiber Channel Protocol. The lower communications network 5 conducts data communications in units of blocks with the storage unit 3 via a lower communications network 7A and 7B such as a SAN and the like. The type of protocol is not limited to the Fiber Channel SAN (FC disk SAN), and other protocols such as TCP/IP (Transmission Control Protocol/Internet Protocol) and the like can also be used.

The control unit 6 controls operation of the controllers 2A and 2B, and for example, can be configured as a control device having a CPU (Central Processing Unit), a ROM (Read Only Memory), a RAM (Random Access Memory), and a ASIC (Application Specific Integrated Circuit) and the like. The function of the control unit 6 is further described below.

The path switching unit 7 controls the path between the lower communications network 5 and the storage unit 3. Under normal conditions, the path switching unit 7 selects the primary path, however the alternate path is selected when a fault occurs. The path switching units 7 of the controllers 2A and 2B are connected via the path 7C.

For example, from the point of view of the controller 2A, under normal conditions the lower communications network 5 accesses the storage unit 3 via the primary path 7A. When a fault occurs in the primary path 7A and the primary path 7A can no longer be used, the path switching unit 7 switches to the alternate path 7B based on an instruction from the control unit 6. Thus, the control unit 6 of the controller 2A can access the storage unit 3 via the alternate path 7B and read and write data.

From the point of view of the other controller 2B, under normal conditions the lower communications network 5 accesses the storage unit 3 via the primary path 7B. When a fault occurs in the primary path 7B, since the path switching unit 7 switches from the primary path 7B to the alternate path 7A, the control unit 6 of the controller 2B can access the storage unit 3 via the alternate path 7A.

The switching permission unit 8 confers switching permission to the path switching unit 7, based on an instruction from the control unit 6. When permission is received from the switching permission unit 8, the path switching unit 7 switches the path.

The functions of the control unit 6 is described below. As shown in the control unit 6 of the controller 2A, the control unit 6 can have, for example, an initial setup complete detection unit 6A, a fault detection unit 6B, and a switching request output unit 6C. Furthermore, as shown in the controller 2B, the control unit 6 can also have a preparation status detection unit 6D. The control units 6 of the controllers 2A and 2B have the units 6A through 6D, and are of the same configuration.

The initial setup complete detection unit 6A detects whether or not initial setup of the lower communications network 5 is complete. For example, when the controllers 2A and 2B are installed in the storage control device 1, the lower communications network 5 begins initial setup. The lower communications network 5 may be used when initial setup of the lower communications network 5 is complete. A few seconds, for example, is necessary for completion of initial setup.

The fault detection unit 6B detects whether or not a fault has occurred in the storage unit 3 path. For example, when a fault occurring due to damage to a fiber cable, or a port malfunction, and the like occurs, the fault is detected by the fault detection unit 6B, and the fault detection signal is output to the switching request output unit 6C. When the occurrence of a fault is communicated to the switching request output unit 6C, the switching request signal is output to the switching permission unit 8 via the control path 8A.

The preparation status detection unit 6D is connected to the initial setup complete detection unit 6A of the partner controller via the control path 6E. When the preparation status detection unit 6D is aware that the lower communications network 5 of the partner controller has completed initial setup, the preparation status detection unit 6D outputs the preparations complete signal to the switching permission unit 8.

When both the switching request signal and the preparations complete signal are input to the switching permission unit 8, the switching signal is output to the path switching unit 7. Thus, the path switching unit 7 switches the path. For example, when a fault occurs in the path 7A of one controller 2A, the lower communications network 5 of this controller 2A accesses the storage unit 3 via the paths 7C and 7B. Similarly, when a fault occurs in the path 7B of the other controller 2B, the lower communications network 5 of the controller 2B accesses the storage unit 3 via the paths 7C and 7A.

In the present embodiment, when a fault occurs in either of the storage unit 3 paths 7A or 7B, since the storage unit 3 can be accessed from the switching path 7C via the other paths 7B and 7A, fault tolerance is improved.

Furthermore, in the present embodiment, the configuration for switching paths uses not only the switching request signal to switch paths, but also the preparations complete signal indicating whether or not switching preparations have been completed. Therefore, after switching preparations are verified as complete in the switching source (fault generation source) controller, the storage unit 3 path can be switched, and reliability is further improved.

Malfunction of the switching request output unit 6C for some reason is possible, however, it is also possible that the controller 2A is installed in the storage control device 1 during operation without noticing this malfunction. In this case, since the switching request output unit 6C is malfunctioning, it is possible that the switching request signal is output irrespective of the fact that no fault has occurred in the path. On the other hand, when this controller 2A is installed in the storage control device 1, the lower communications network 5 begins initial setup.

When the storage unit 3 path is forcibly switched in accordance with an incorrect switching request signal prior to completion of initial setup of the lower communications network 5, the controllers 2A and 2B can no longer access the storage unit 3. If the lower communications network 5 of the controller 2A completes initial setup and is not in the usable status, since the path cannot be established the access request from the host 9 cannot be processed in some cases.

On the other hand, the present embodiment is configured so that path switching is controlled in consideration not only of the switching request signal, but also of the status of the preparations complete signal. Therefore, occurrence of a situation in which the path is switched prior to completion of switching preparations can be prevented, and reliability is improved.

First Embodiment

Figure 2:
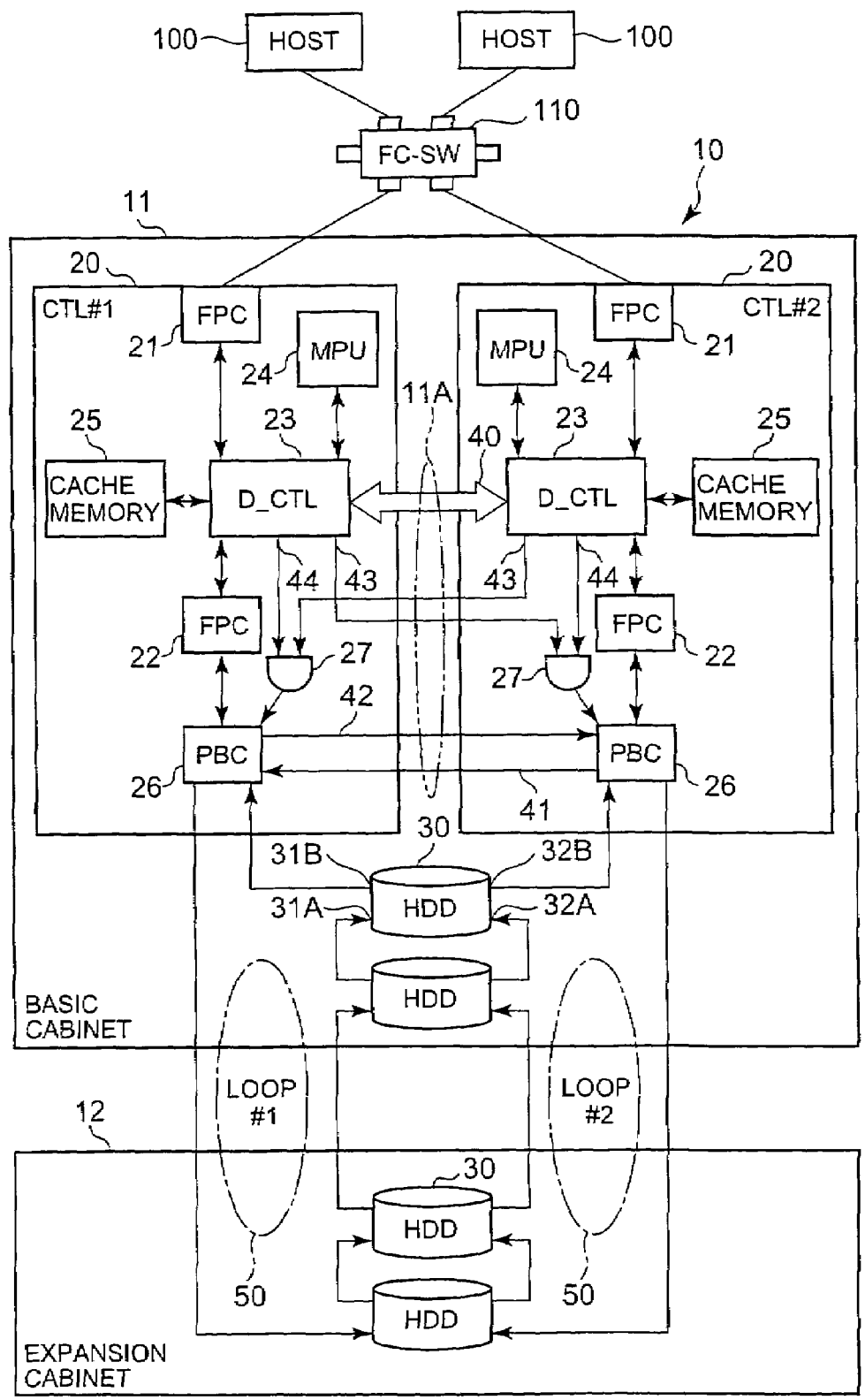
FIG. 2 is a block diagram showing the overall structure of the storage control device.

FIG. 2 is a block diagram showing the overall configuration of the storage control device 10 according to the present embodiment. FIG. 2 shows the overall storage system including the storage control device 10 in outline. The storage control device 10 in FIG. 2 corresponds to the storage control device 1 in FIG. 1, the host 100 in FIG. 2 corresponds to the host 9 in FIG. 1, the disk drive 30 in FIG. 2 corresponds to the storage unit 3 in FIG. 1, the high-speed bus 40 in FIG. 2 corresponds to the path 6E in FIG. 1, the signal lines 41 and 42 in FIG. 2 correspond to the path 7C in FIG. 1, the signal line 43 in FIG. 2 corresponds to the path 8A in FIG. 1, and the loops 50 and 50 in FIG. 2 correspond to the paths 7A and 7B in FIG. 1. Furthermore, the FPC 21 in FIG. 2 corresponds to the upper communications unit 4 in FIG. 1, the FPC 22 in FIG. 2 corresponds to the lower communications network 5 in FIG. 1, the PBC 26 in FIG. 2 corresponds to the path switching unit 7 in FIG. 1, and the AND gate 27 in FIG. 2 corresponds to the switching permission unit 8 in FIG. 1. The entirety of the D_CTL 23, MPU 24, and cache memory 25 in FIG. 2 corresponds to the control unit 6 in FIG. 1.

The storage control device 10 may be connected to a plurality of hosts 100 via a relay device such as a FC-SW (Fiber Channel Switch) 110 and the like. The host 100 and the storage control device 10 can be connected via a network such as a SAN.

The host 100 can be configured as, for example, a personnel computer, workstation, mainframe and the like. The network connecting the host 100 and the storage control device 10 is not limited to a SAN, and a LAN (Local Area Network), the Internet, a dedicated line, or a public line and the like may be used as appropriate. When a LAN or the Internet is used, data can be transferred in units of files based on, for example, the TCP/IP protocol. When the host 100 is configured as a mainframe, the host 100 can transfer data in accordance with communications protocols such as FICON (Fiber Connection (registered trademark)), ESCON (Enterprise System Connection (registered trademark)), ACONARC (Advanced Connection Architecture (registered trademark)), and FIBARC (Fiber Connection Architecture (registered trademark)) and the like.

Figure 3:
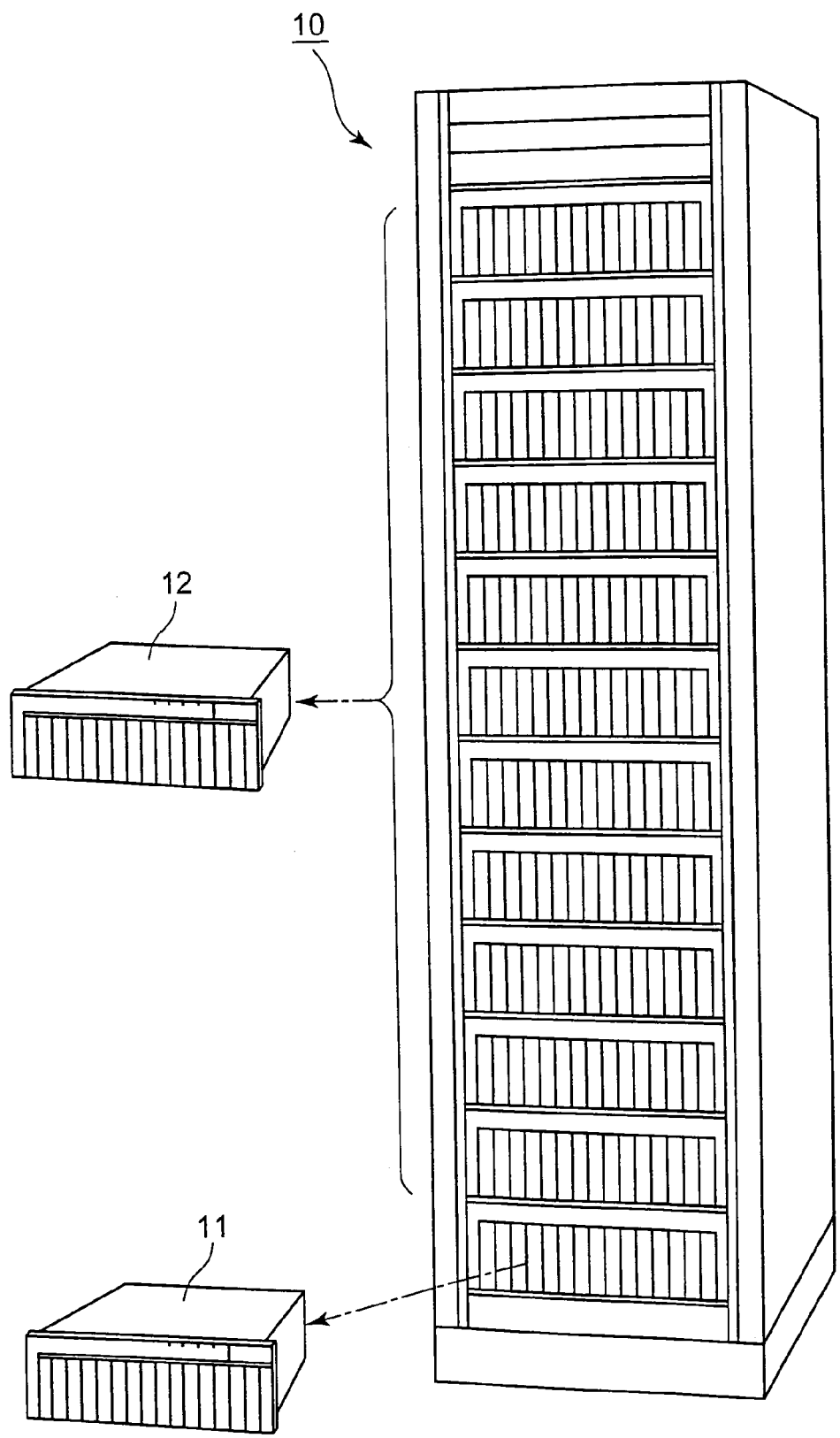
FIG. 3 is an external view of the storage control device.

The storage control device 10 is configured as, for example, a disk array system, and as shown in, for example, the external view in FIG. 3, can be comprised of a basic cabinet 11 and an expansion cabinet 12. As shown in FIG. 3, the basic cabinet 11 and a plurality of expansion cabinets 12 can be removably fitted in the storage control device 10 rack. The basic cabinet 11 controls operation of the storage control device 10. The expansion cabinet 12 expands the disk drive 30.

In FIG. 2, the basic cabinet 11 can be configured to have, for example, a plurality of controllers (CTL) 20 and 20, and a plurality of disk drives 30. Each controller 20 independently processes commands received from the host 100, and reads and writes data to and from the disk drive 30. Each controller 20 is duplicated with the same configuration.

A single controller 20 is described below. The controller 20 can be configured to have, for example, an FPC (Fiber channel Protocol Chip) 21 and 22, a D_CTL (Data Control Chip) 23, an MPU (Micro Processing Unit) 24, a cache memory 25, a PBC (Port Bypass Circuit) 26, and an AND gate 27.

One FPC 21 is a circuit conducting communications with the host 100, and converts between the PCI (Peripheral Components Interconnect) and the Fiber Channel Protocol. The other FPC 22 is a circuit conducting communications with the disk drive ('HDD' in the figure) 30, and converts between the PCI and the Fiber Channel Protocol.

The D_CTL 23 is a circuit conducting data processing. By loading and executing the prescribed program, the MPU 24 realizes the various functions described below, and controls the controller 20. The cache memory 25 stores data received from the host 100, and stores data read from the disk drive 30. The PBC 26 is a circuit for controlling the connection path to each disk drive 30. A practical example of the PBC 26 is described further below.

When the control signals output from the self system and the other system D_CTL 23 are both at high level, the AND gate 27 outputs the switching signal to the PBC PBC 26. Here, 'self system' is the control system (controller 20 and the like) in which the AND gate 27 exists, and 'other system' is the control system in which the AND gate 27 does not exist.

The controllers 20 are connected via the backboard 11A installed covered in the rear of the basic cabinet 11. The D_CTL 23 of each controller 20 are connected via the high-speed bus 40. The AND gate 27 is connected to the self system D_CTL 23 via a signal line 44 connected to one input, and to the other system D_CTL 23 via a signal line 43 connected to the other input. The output of the AND gate 27 is connected to the self system PBC 26. Each PBC 26 is connected via the alternate connection paths 41 and 42. The high-speed bus 40, the signal line 43, and the alternate connection paths 41 and 42 are configured using the backboard 11A. Connectors and the like for connection to the disk drives 30 are provided on the backboard 11A.

Next, the configuration of the storage unit is described below. The basic cabinet 11 and the expansion cabinet 12 can each have a plurality of disk drives 30. When storage capacity is insufficient with only the disk drive 30 of the basic cabinet 11, the expansion cabinet 12 is connected to the basic cabinet 11. Thus, storage capacity can be increased in a stepped manner in accordance with the wishes of the user.

The disk drive 30 is configured as a hard disk drive such as a FC (Fiber Channel) disk or a SATA (Serial AT Attachment) disk and the like. However, the disk drive 30 is not limited to this configuration and other storage devices such as semiconductor memory drives and optical disk drives and the like can also be used.

Each disk drive 30 has a plurality of I/O interfaces 31A, 31B, 32A, and 32B. One controller 20 (CTL#1) is connected to each disk drive 30 via one interface, and the other controller 20 (CTL#2) is connected to each disk drive 30 via another interface.

The disk drives 30 are connected in a loop format via the interfaces. One controller 20 (CTL#1) is part of the loop 50 (#1), and the other controller 20 (CTL#2) is part of the loop 50 (#2). As seen from the controller 20 (CTL#1), the loop 50 (#1) is the primary loop, and the loop 50 (#2) is the alternate loop. Conversely, as seen from the other controller 20 (CTL#2), the other loop 50 (#2) is the primary loop, and the loop 50 (#1) is the alternate loop.

Normally, each controller 20 accesses the disk drives 30 via a primary loop, and reads and writes data. Since the PBCs 26 of the self system and the other system switch the connection destination loop when a fault occurs in the primary loop, the controllers 20 access the disk drives 30 via the alternate loop.

The situation is described below as seen from the controller 20 (#1). Under normal conditions, the D_CTL 23 accesses the disk drives 30 via the FPC 22, the PBC 26, and the loop 50 (#1). When a fault occurs in the loop 50 (#1), the PBC 26 is operated with the switching signal from the AND gate 27, and loop 50 (#2) is selected in place of loop 50 (#1). In other words, under normal conditions, the D_CTL 23 is connected to the other system loop 50 (#2) via the FPC 22, the PBC 26, and the alternate connection path 42.

Figure 4:
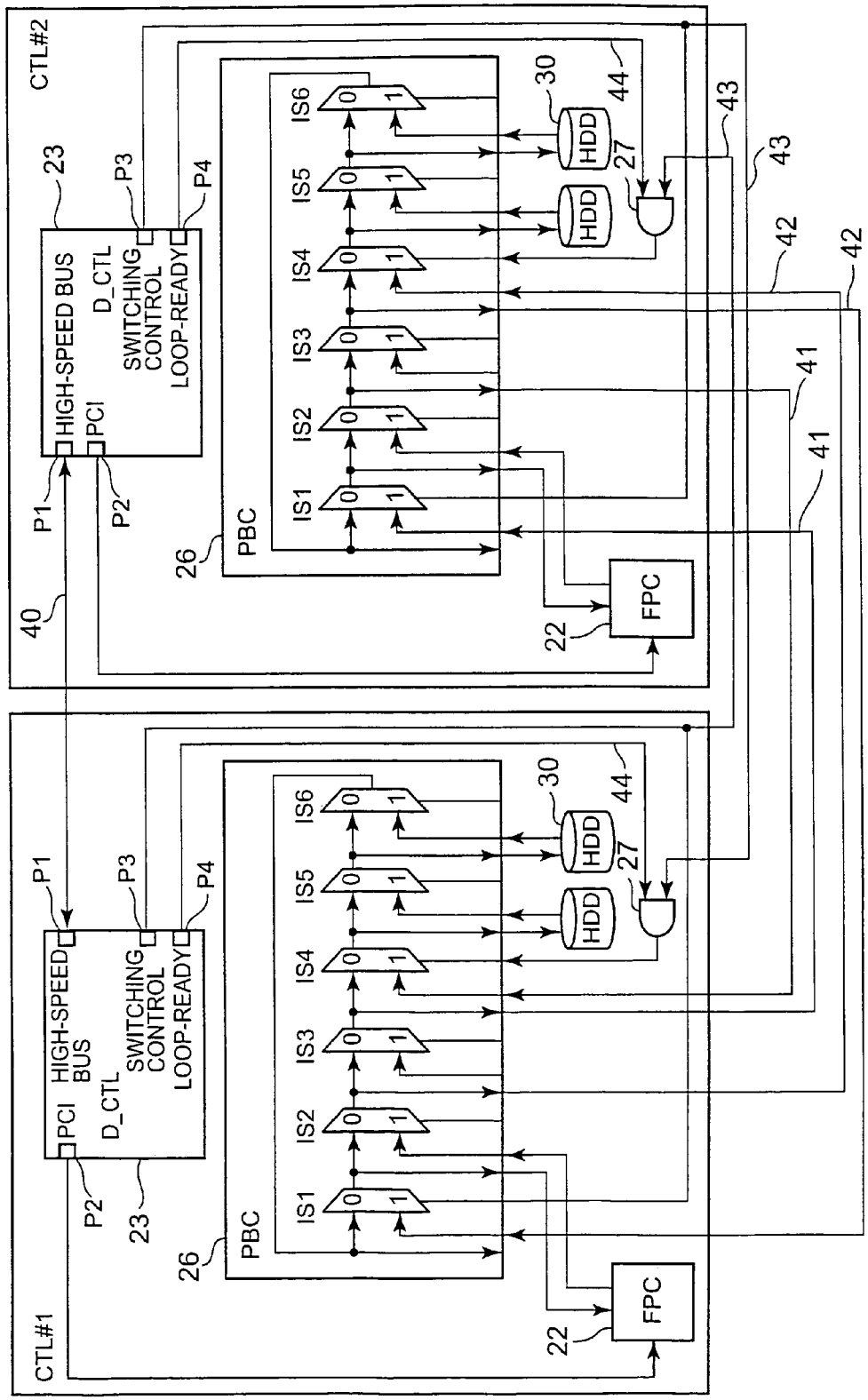
FIG. 4 is a circuit diagram showing an enlargement of part of the storage control device.

FIG. 4 is a circuit diagram showing the main parts of the controllers. The D_CTL 23 can have the high-speed interface P1 for connection to the high-speed bus 40, the PCI interface P2 for connection to the FPC 22 via the PCI bus, the terminal P3 for outputting the switching control signal (also referred to as the 'alternate control signal'), and the terminal P4 for outputting the preparations complete signal (the 'LOOP READY' signal in the figure).

The high-speed interfaces P1 of the controllers 20 are connected to the high-speed bus 40, and control information and the like can be exchanged between each controller at high-speed. Each controller 20 is connected to the FPC 22 via the PCI interface P2. Each controller 20 terminal P3 is connected to the self system PBC 26, and to the other system AND gate 27 via the signal line 43. The terminal P4 of the controller 20 is connected to the self system AND gate 27.

The PBC 26 can be comprised of, for example, a plurality of selectors (or multiplexers) IS1 through IS6. In FIG. 4, the PBCs 26 are shown in simplified form, however the function of the PBCs 26 is the switching of the FPC 22 connection destination.

Figure 5:
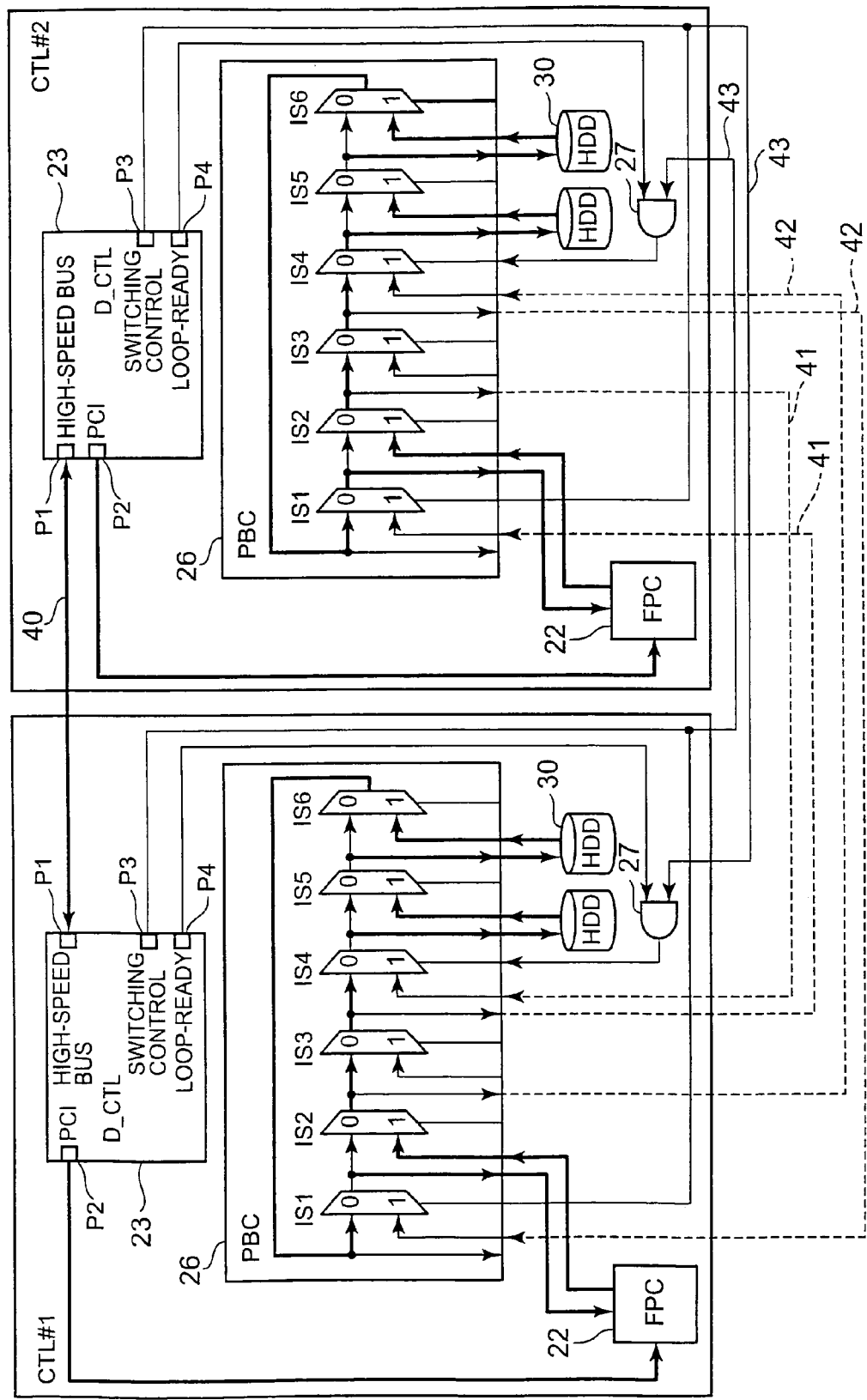
FIG. 5 is a circuit diagram showing data flow under normal conditions.

FIG. 5 is a diagram showing data flow under normal conditions. The thick lines in the figure represent signal lines carrying data, the dashed lines represent signal lines not carrying data, and the thin lines represent control signal lines. Each controller 20 accesses the disk drive 30 via the respective loop 50.

Figure 6:
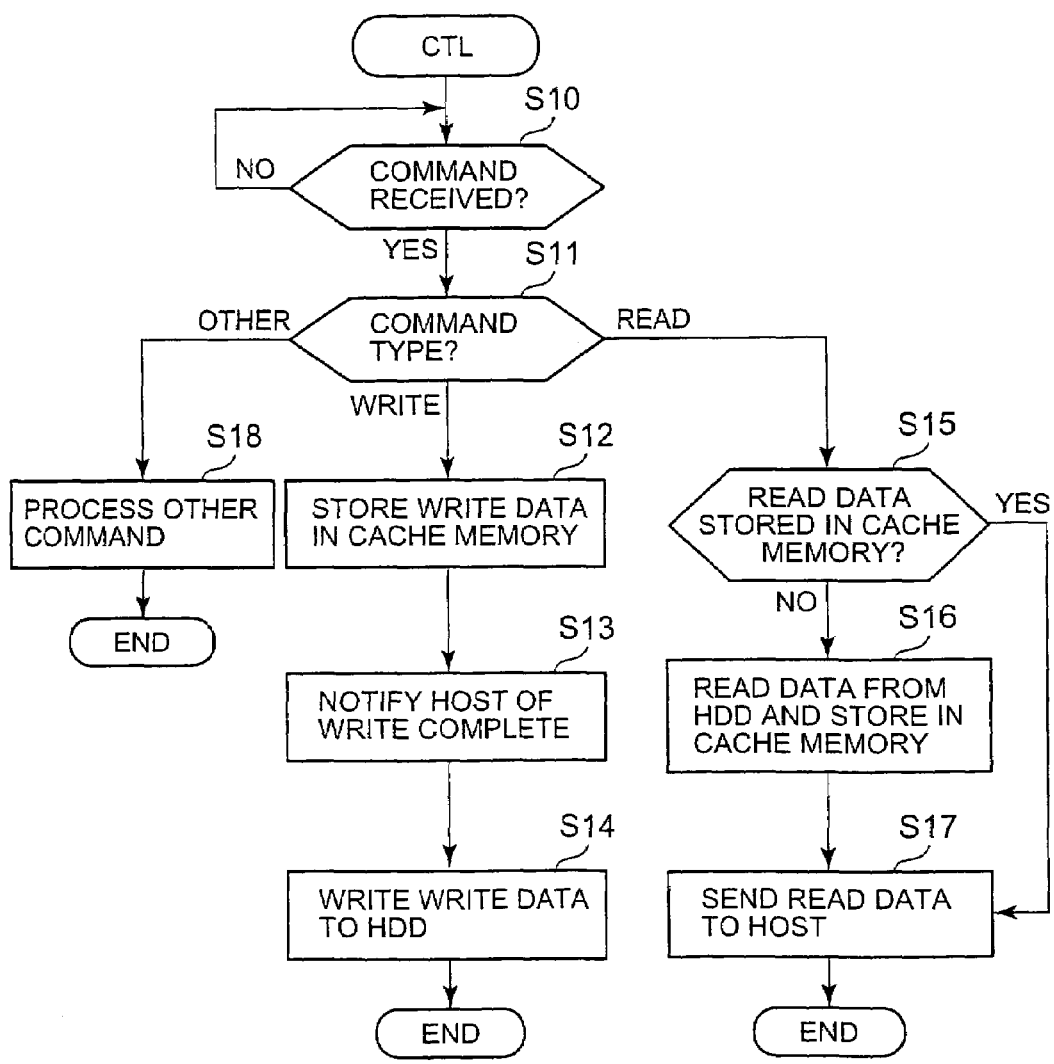
FIG. 6 is a flowchart for processing commands from the host.

Next, operation of the present embodiment is described. FIG. 6 is a flowchart showing processing of commands with the controller 20.

When the controller 20 receives a command from the host 100 via the FPC 21 (YES in S10), the received command type is identified (S11). When a write command is received, the controller 20 stores the write data received from the host 100 in the cache memory 25 (S12), and notifies the host 100 of write complete (S13). The controller 20 then writes the write data stored in the cache memory 25 to the disk drive 30 with, for example, the appropriate prescribed timing (S14).

Here, the prescribed disk drive 30 is a disk drive corresponding to a logical volume accessed by the host 100. The host 100 specifies the logical address (LBA (Logical Block Address)) of the logical volume and issues write data. The controller 20 converts this logical address to the physical address of the disk drive 30, and writes data.

The timing with which write data is written to the disk drive 30 need not be asynchronous with the timing with which the write complete report is written to the host 100 as described above, and may be synchronous wherein write complete is communicated to the host 100 after write data has been written to the disk drive 30.

When the command received from the host 100 is a read command, the controller 20 evaluates whether or not the data requested from the host 100 is stored in the cache memory 25 (S15). When the data requested from the host 100 is stored in the cache memory 25 (YES in S15), the controller 20 reads the data stored in the cache memory 25, and induces that data to be sent to the FPC 21. When the data requested from the host 100 is not stored in the cache memory 25 (NO in S15), the controller 20 accesses the disk drive 30 via the FPC 22, the PBC 26, and the loop 50. The controller 20 reads data from the prescribed disk drive 30 and induces that data to be stored in the cache memory 25 (S16). The controller 20 induces data stored in the cache memory 25 to be sent to the host 100 (S17).

When the command received from the host 100 is neither a write command nor a read command, other command processing is conducted (S18). These other commands can be, for example, an inquiry command, or a read-capacity command and the like.

Figure 7:
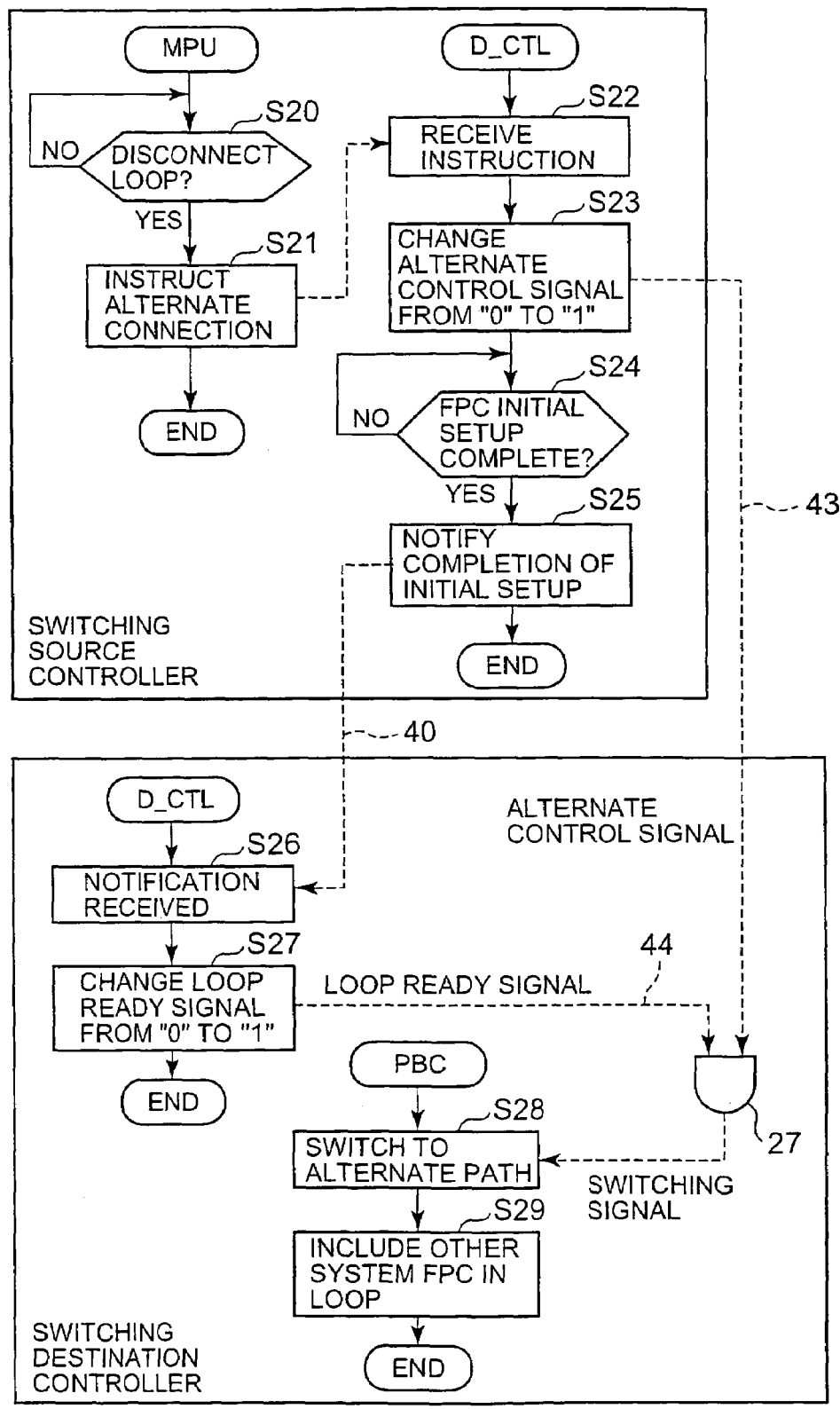
FIG. 7 is a flowchart showing path switching processing for connection to a disk drive.

Next, FIG. 7 is a flowchart showing path switching processing when a fault has occurred in the loop 50. The MPU 24 of the controller 20 being the switching source monitors the status of the loop 50 with the prescribed frequency (S20). For example, when a malfunction occurs in the disk drive 30 port, or the fiber cable is damaged and the like, the loop 50 is disconnected. Disconnection of the loop 50 is detected by the MPU 24 (YES in S20). The MPU 24 instructs connection to the D_CTL 23 (S21).

When the D_CTL 23 of the controller 20 being the switching source receives an instruction from the MPU 24 (S22), the D_CTL 23 changes the signal level of the alternate control signal output from the terminal P3 from '0' to '1'. In other words, the terminal P3 output is normally low level, however, with alternate connection, the terminal P3 output changes from low level to high level. The D_CTL 23 also outputs the alternate control signal to the PBC 26 of the controller 20 being the switching source.

The D_CTL 23 then evaluates whether or not initial setup of the FPC 22 is complete (S24). If initial setup is complete (YES in S24), this fact is communicated to the D_CTL 23 of the controller 20 being the switching source via the high-speed bus 40 (S25). Here, since the case in which a fault has occurred in the storage control device 10 during operation is described, initial setup of the FPC 22 is already complete, and this fact is communicated to the partner controller 20.

Consider the controller 20 being the switching source. The D_CTL 23 of the controller 20 being the switching destination receives notification of the fact that initial setup of the FPC 22 is complete (notification indicating that the FPC 22 is in the usable status) from the D_CTL 23 of the controller 20 being the switching source (S26). When the D_CTL 23 receives this notification, the D_CTL 23 changes the signal level of the LOOP READY signal (preparations complete signal) output from the terminal P4 from low level to high level (S27).

When both the alternate signal and the LOOP READY signal change to high level, the AND gate 27 of the controller 20 being the switching destination outputs the high level switching signal to the PBC 26.

When the PBC 26 receives the switching signal from the AND gate 27, the alternate path is selected (S28), and the other system FPC 22 (in other words, the FPC 22 of the controller 20 being the switching source) is induced to become part of the system loop 50 (S29). Thus, the controller 20 in which a fault has occurred may be accessed from the disk drives 30 via the other loop 50.

Figure 8:
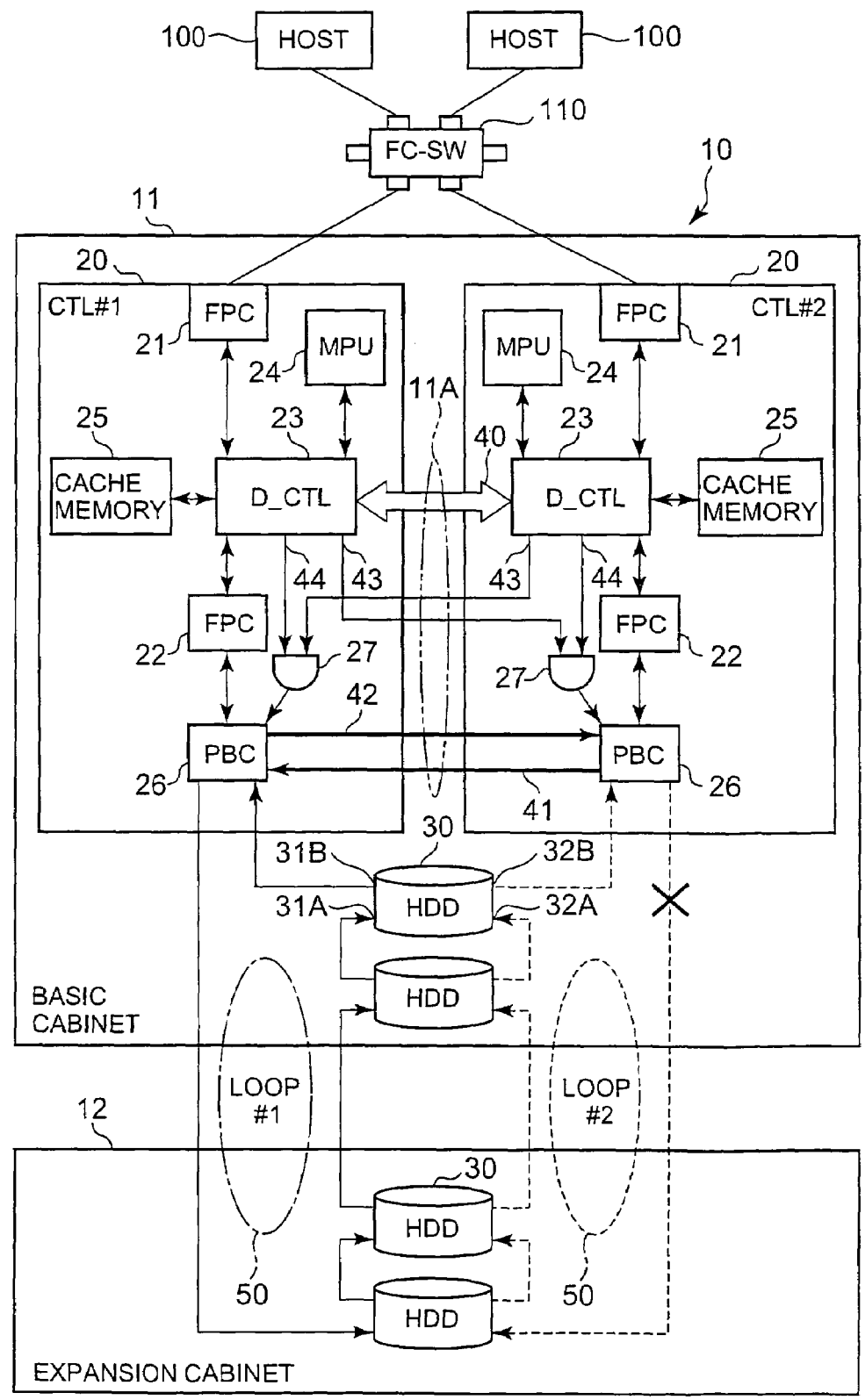
FIG. 8 is a block diagram showing the state of path switching when a fault has occurred in a loop.
Figure 9:
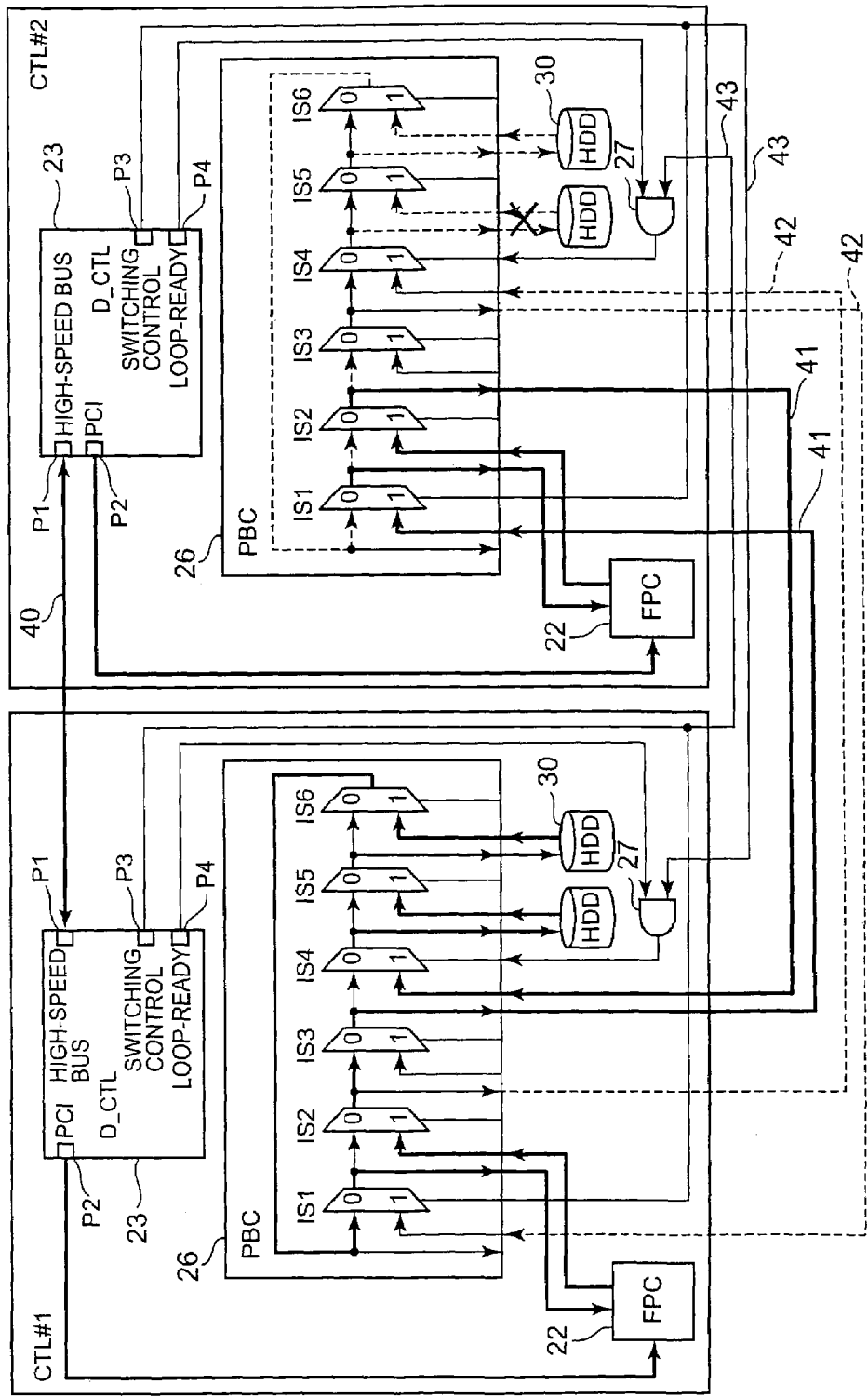
FIG. 9 is a circuit diagram showing data flow when a path is switched.

FIG. 8 and FIG. 9 show the state of the operation described in FIG. 7. As shown in the block diagram in FIG. 8, for example, when a fault occurs in the loop 50 (#2) of the controller 20 (#2), the FPC 22 of this controller 20 (#2) is connected to the loop 50 (#1) of the other system via the alternate connection path 41 and the like.

Details are shown in the circuit diagram in FIG. 9. The output of the selector IS2 of the PBC 26 of the controller 20 (#2) being the switching source is connected to the selector IS4 of the PBC 26 of the controller 20 (#1) being the switching destination via the alternate connection path 41. The data from the controller 20 (#2) flows from the selector IS4 through the disk drives 30 and selectors IS5 and IS6, to the loop 50 (#1), and is input to the first stage selector IS1. The data then flows from IS1 through the FPC 22, IS2, and IS3 to the alternate connection path 41, and returns to the switching source PBC 26.

Figure 10:
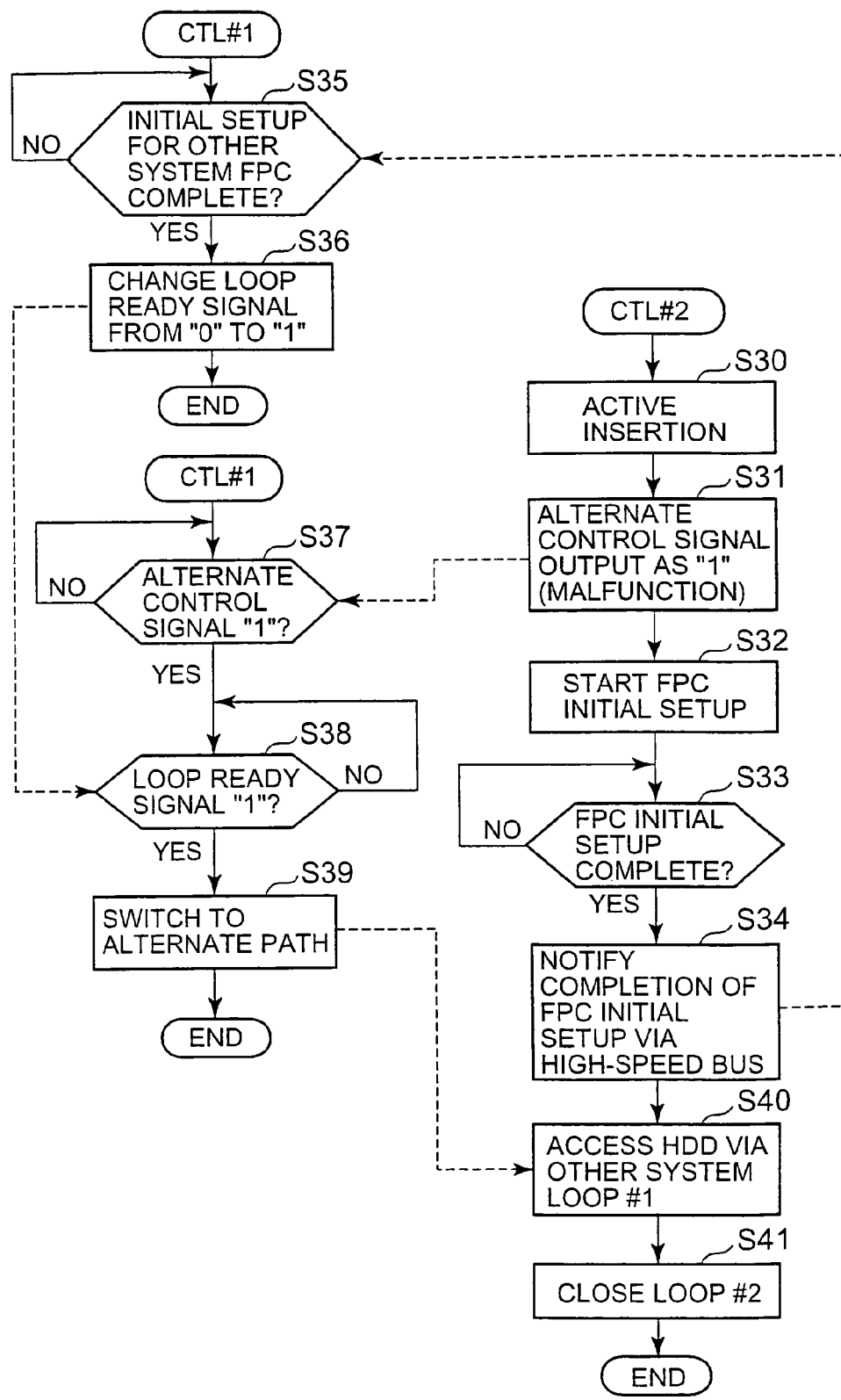
FIG. 10 is a flowchart showing path switching processing when a controller in which a malfunction related to output of the alternate control signal has occurred is active-line inserted in the storage control device.
Figure 11:
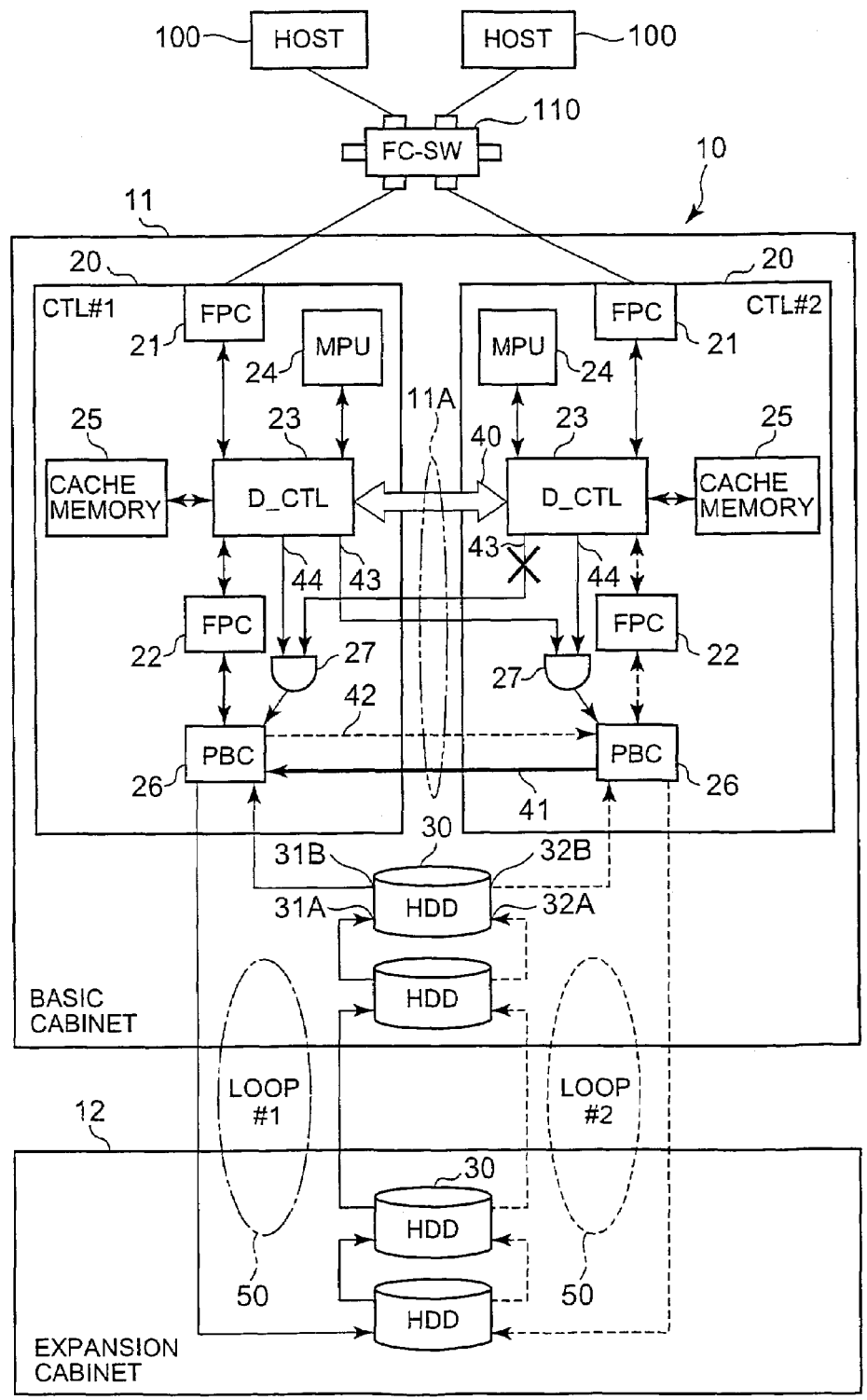
FIG. 11 is a block diagram showing the state when a controller in which a malfunction related to output of the alternate control signal has occurred is active-line inserted in the storage control device.

Next, operation when a malfunctioning controller 20 is active-line inserted is described in reference to FIG. 10 and FIG. 11. Here, it is assumed that a malfunction related to the alternate control signal has occurred in the controller 20 (#2). With this malfunction, a high level alternate control signal is output from D_CTL 23 irrespective of whether or not the loop 50 (#2) is normal.

The storage control device 10 can replace either controller 20 (#1) or controller 20 (#2) without halting operation, and without inducing halting access from the host 100. Installation and removal of the controller 20 under these operating conditions is referred to here as 'active-line insertion'. The case in which a user such as the system manager and the like removes the controller 20 (#2) from the storage control device 10 and again installs the controller 20 (#2) in the storage control device 10 is described as an example.

When the malfunctioning controller 20 (#2) is active-line inserted in the storage control device 10 (S30), the D_CTL 23 of this controller 20 (#2) outputs the high level alternate control signal irrespective of the status of the loop 50 (#1) (S31). Input of the alternate control signal is detected in the controller 20 (#1) being the switching destination (S37). However, since the LOOP READY signal is not yet input at this point in time, participation in the alternate loop 50 (#1) is not permitted.

In the controller 20 (#2) installed in the storage control device 10, the FPC 22 begins initial setup (S32). When initial setup of the FPC 22 is complete (YES in S33), the controller 20 (#2) notifies the controller 20 (#1) that initial setup of the FPC 22 is complete and that the FPC 22 is in the operational status (S34). Notification of this switchable status is conducted via the high-speed bus 40 connecting the D_CTLs 23.

When the controller 20 (#1) being the switching source is aware that initial setup of the FPC 22 of the controller 20 (#2) has been completed (YES in S35), the controller 20 (#1) changes the LOOP READY signal from low level to high level (S36).

Thus, since the alternate control signal and the LOOP READY signal are both input to the AND gate 27 of the controller 20 (#1) (YES in S38), the switching signal is output from the AND gate 27 to the PBC 26, and the path is switched (S39). Thus, the controller 20 (#2) is part of the loop 50 (#1), and can access the disk drives 30 (S40). Thereafter, the primary loop 50 (#2) of the controller 20 (#2) being the switching source is closed.

The afore-mentioned configuration of the present embodiment demonstrates the following benefits. The present embodiment is configured so that path switching with the PBC 26 is permitted when both the alternate control signal and the LOOP READY signal are ready. Therefore, even if, the controller 20 (#2) in which a malfunction has occurred in the alternate control signal output part is active-line inserted in the storage control device 10, the path can be switched normally, and the access request from the host 100 can be processed.

Figure 12:
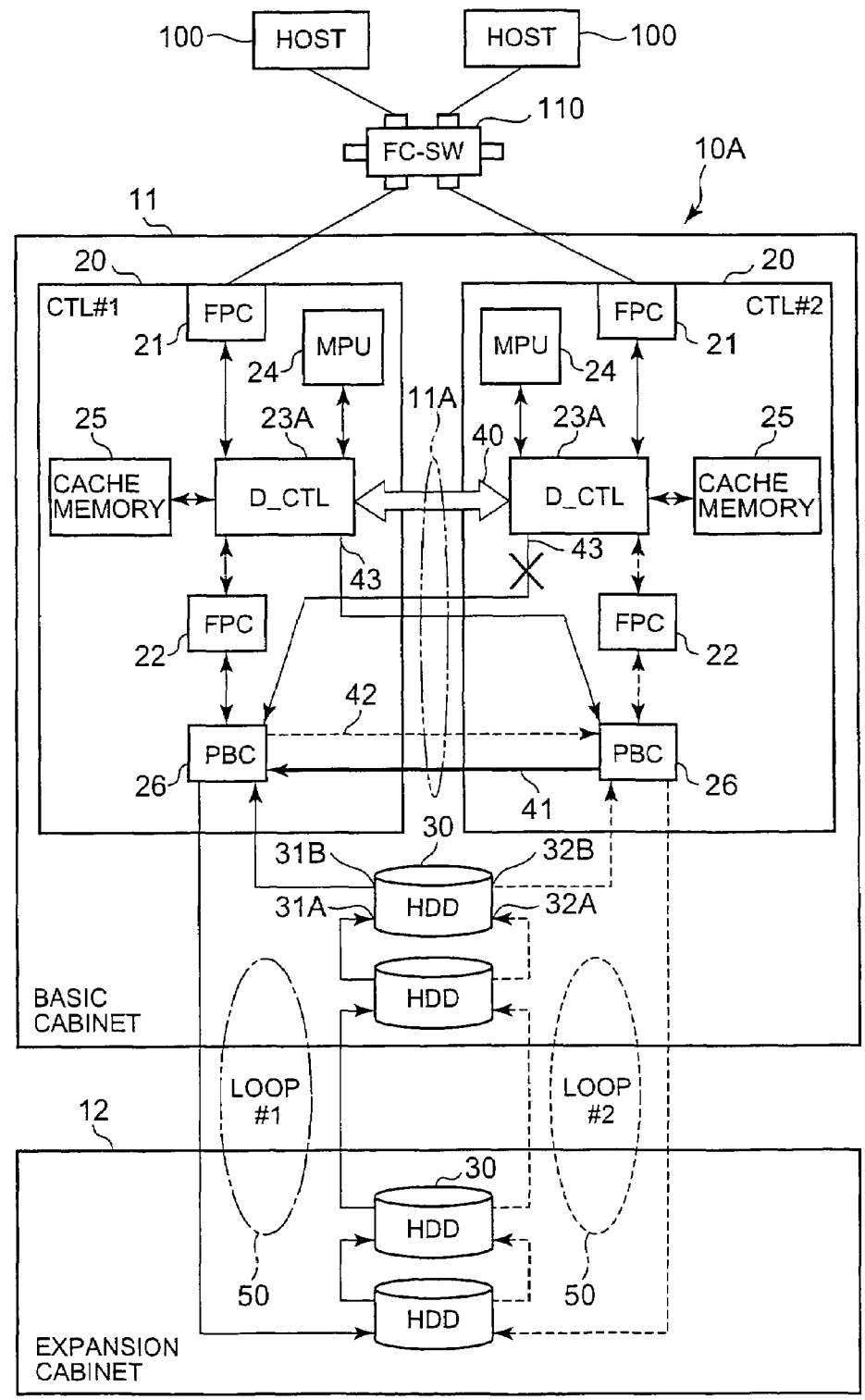
FIG. 12 is a block diagram of a storage control device used for comparison with the present embodiment.
Figure 13:
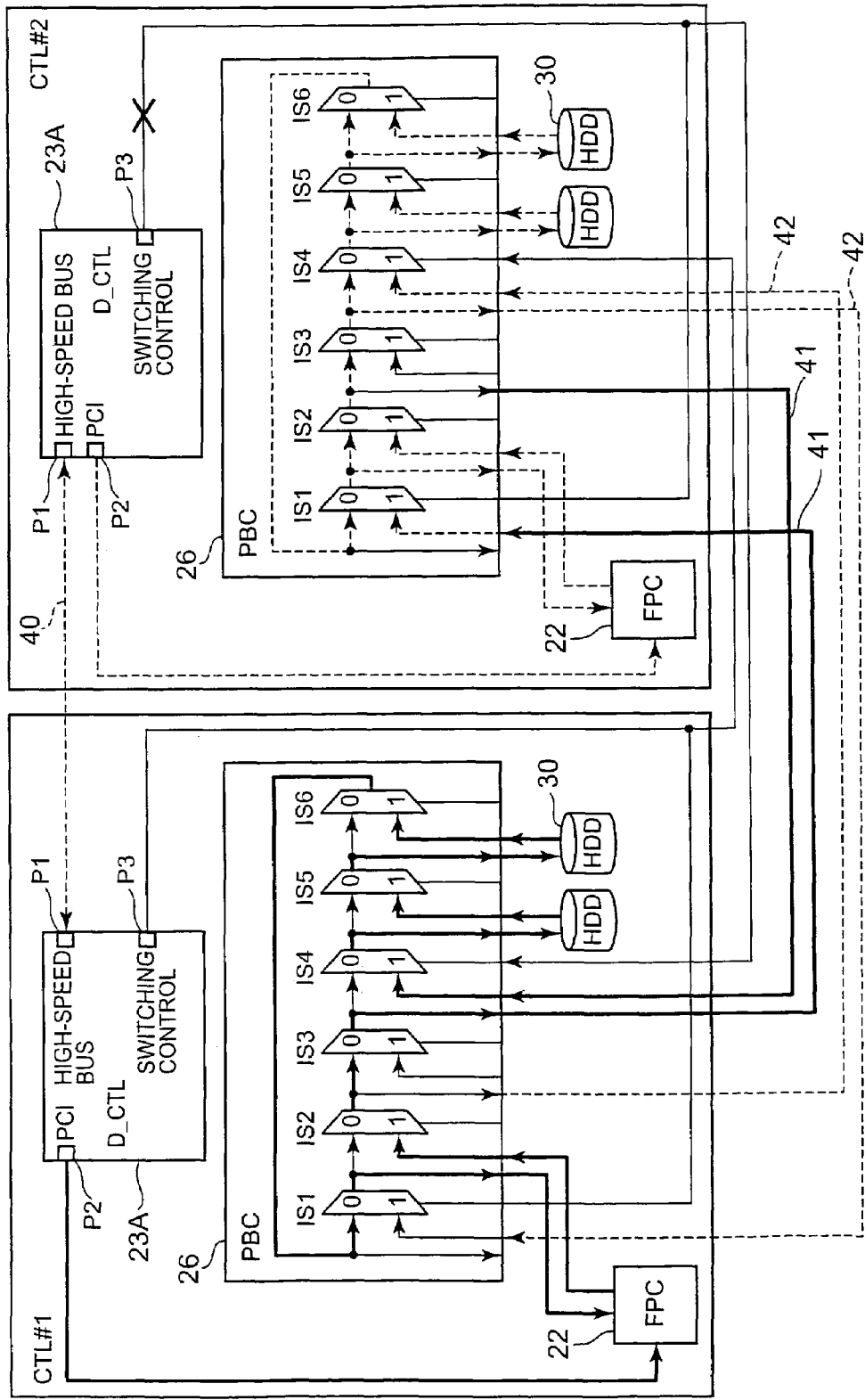
FIG. 13 is a circuit diagram showing the state of a disconnected loop when a path is switched in the comparative example.

This point is described in reference to FIG. 12 and FIG. 13. FIG. 11 and FIG. 12 show the storage control device 10A as a comparative example used for describing the benefits of the present embodiment. The configuration related to the LOOP READY signal and the configuration related to the AND gate 27 have been removed from this storage control device 10A. This storage control device 10A conducts path switching to the disk drives 30 based only on the alternate control signal.

When the malfunctioning controller 20 (#2) is active-line inserted in the storage control device 10A, the high level alternate control signal is input to the PBC 26 of the switching destination controller 20 (#1). Thus, since the PBC 26 immediately switches the path, the controller 20 (#2) being the switching source is forcibly connected to the loop 50 (#1).

However, initial setup of the FPC 22 is not complete immediately after the controller 20 (#2) is installed in the storage control device 10A. Therefore, as shown in the circuit diagram in FIG. 13, the loop 50 (#1) is broken at the FPC 22 not in the operational status, and linkup (synchronous completion) is not possible. Therefore, the loop 50 (#1) is in the unusable status, and data cannot be read from or written to the disk drives 30. Thus, synchronous write command processing, and read command processing related to data stored in the cache memory 25, is no longer possible.

On the other hand, in the present embodiment, even when the controller 20 (#2) in which the alternate control signal output part is malfunctioning is active-line inserted in the storage control device 10, stable path switching can be conducted due to the path switching configuration based on both the alternate control signal and the LOOP READY signal. Therefore, reliability of the storage control device 10 is improved.

Furthermore, the present embodiment is configured so that, in the controller 20 (#2), information indicating whether or not switching preparations have been completed is communicated, via the high-speed bus 40, to the controller 20 (#1) being the switching destination. Therefore, stable path switching can be conducted without changing the configuration of the backboard 11A and the like.

To solve the problems described in reference to FIG. 12 and FIG. 13, it is also possible to multiplex the configuration of the part outputting the alternate control signal. However, when the configuration related to the alternate control signal is multiplexed, the number of output terminals connected to the backboard 11A from the controller 20, and the number of signal lines 43 provided in the backboard 11A, increase. As a result, the printed wiring and the like on the backboard 11A becomes increasingly dense, inhibiting further improvements in performance of the storage control device 10. This is due to the fact that increasing the number of loops without changing the area and structure of the backboard 11A becomes difficult.

On the other hand, in the present embodiment, the configuration related to the alternate control signal is not simply multiplexed, a configuration in which completion of not of switching preparations is verified via the high-speed bus 40 being adopted. Therefore, reliability of the storage control device 10 can be improved without increasing the number of output terminals of the controller 20 and the number of signal lines 43, and a greater number of loops can be accommodated.

Second Embodiment

Figure 14:
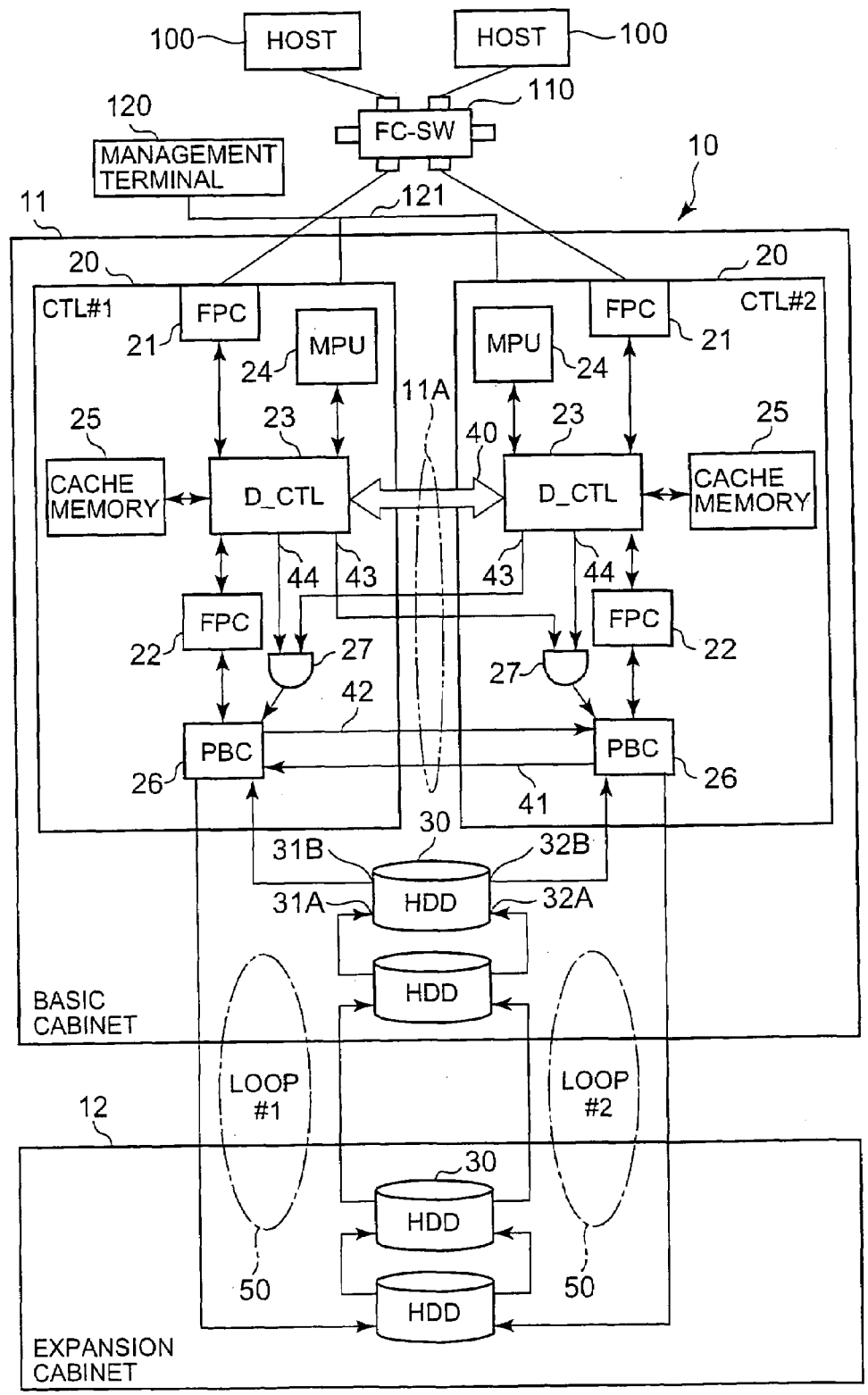
FIG. 14 is a block diagram of the storage control device according to the second embodiment.
Figure 15:
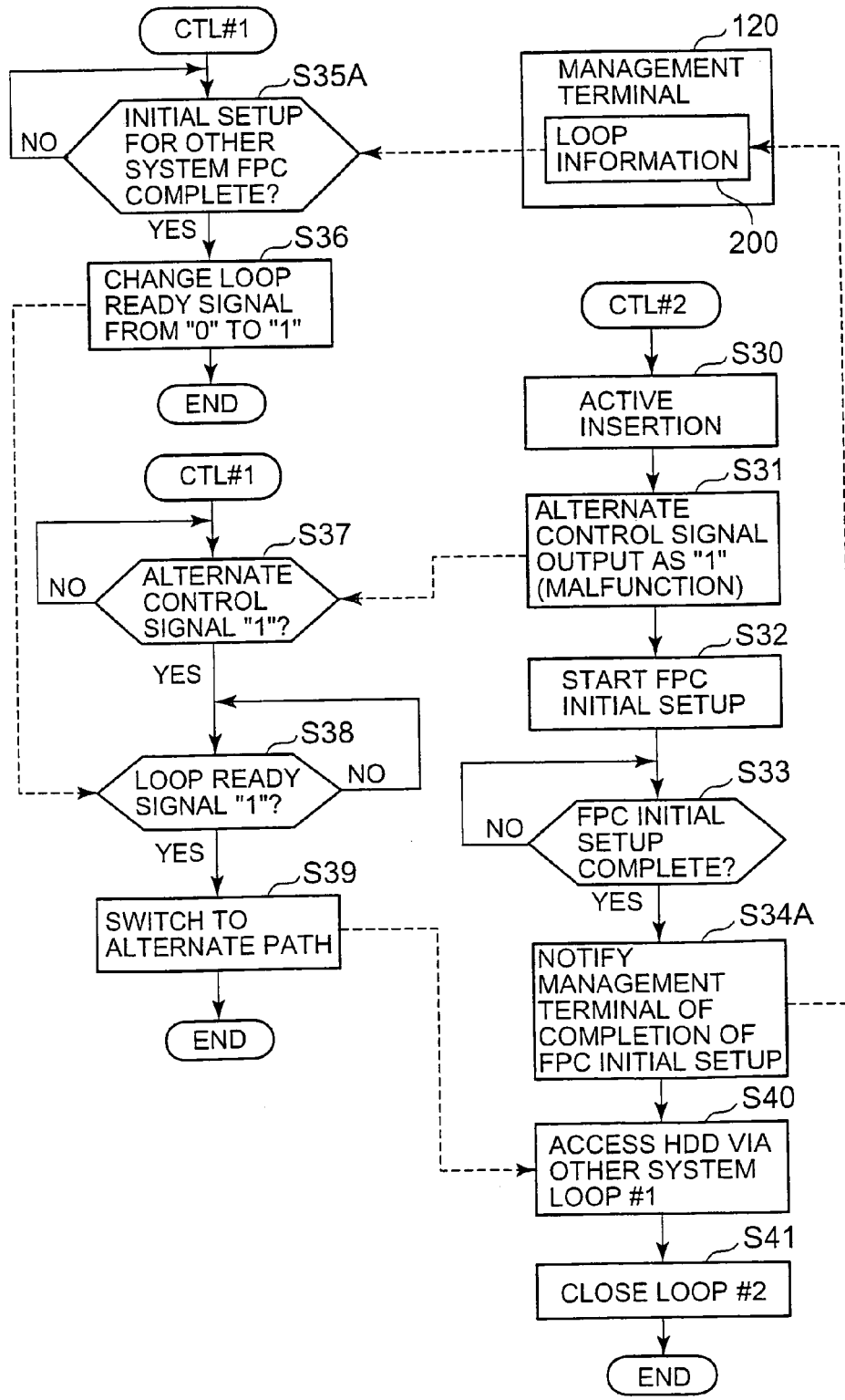
FIG. 15 is a flowchart showing path switching processing.

The second embodiment is described based on FIG. 14 and FIG. 15. The following embodiments, including the present embodiment, correspond to variations of the first embodiment. In the present embodiment, completion of switching preparations is communicated from the switching source controller 20 to the switching destination controller 20 via the management terminal 120.

FIG. 14 is a block diagram showing the overall configuration of the storage control device 10 according to the present embodiment. The management terminal 120 can be comprised of, for example, a personal computer. The management terminal 120 is connected to each controller 20 via a management network 121 such as a LAN.

FIG. 15 is a flowchart showing path switching processing. Descriptions which duplicate the steps described above are omitted, and the description is focused on points of difference in the present embodiment. When initial setup of the FPC 22 is complete (YES in S33), the controller 20 (#2) being the switching source notifies the management terminal 120 that initial setup of the FPC 22 is complete (S34A).

This notification is, for example, stored in the memory of the management terminal 120, or on the local disk, as loop information 200. The loop information 200 indicates that the primary loop was in the normal status at the point in time at which this loop information 200 was created in the controller creating this loop information 200.

By acquiring the loop information 200 from the management terminal 120, the controller 20 (#1) being the switching destination detects whether or not switching preparations have been completed at the switching source (S35A).

The present embodiment configured in this manner demonstrates similar benefits to the first embodiment. Naturally, this loop information 200 is created in each of the controllers 20, and is stored in the management terminal 120.

Third Embodiment

The third embodiment is described based on FIG. 16. In the present embodiment, information indicating that switching preparations have been completed is passed using the prescribed disk drive 30. FIG. 16 is a flowchart showing path switching processing.

When initial setup of the FPC 22 is complete (YES in S33), the controller 20 (#2) being the switching source stores information to the effect that initial setup has been completed on, for example, the prescribed disk drive 30 as loop information 200 (S34B). By acquiring the loop information 200 from the prescribed disk drive 30, the controller 20 (#1) being the switching destination detects whether or not switching preparations have been completed at the switching source (S35B).

Here, if the loop 50 is not in the normal status, initial setup of the FPC 22 cannot be completed. Therefore, when loop information 200 is written to the disk drive 30, the loop 50 is at least in the normal status at that point in time. Thereafter, when a fault occurs in the loop 50 for any reason, the other system controller evaluates whether or not switching is permitted based on the alternate control signal and the loop information 200, and executes processing.

The present embodiment configured in this manner demonstrates similar benefits to the first embodiment. The controller 20 verifies the status of each self loop, creates the loop information 200, and stores the loop information loop information 200 on the prescribed disk drive 30. Here, the loop information 200 can be written to a plurality of disk drives 30 to prevent loss of the loop information 200.

The present invention is not limited to the afore-mentioned embodiments. Various additions and changes and the like are possible within the scope of the present invention. For example, an AND gate has been presented as an example of a circuit for detecting whether or not both the alternate control signal and the LOOP READY signal have been input, however, a NOT device or an OR gate may also be used. A configuration in which the presence of both signals is detected within the D_CTL and the like is also possible.

Furthermore, in each of the afore-mentioned embodiments, examples of cases in which the reliability of the switching control signal (the alternate control signal) of the lower communications network is improved are described. However, the embodiments are not limited to this, and may be applied in a variety of cases in which a controller executes the prescribed operation based on an instruction from another controller such as is the case with a power OFF instruction and the like. Furthermore, the afore-mentioned embodiments may be used appropriately combined.

What is claimed is:

1. A storage control device connected to a host device and plurality of storage devices, comprising:
   a plurality of controllers connected to each storage device via differing lower communications networks, wherein each controller comprises:
   an upper communications unit conducting communications with the host device via an upper communications network;
   a lower communications unit conducting communications with each storage device via a lower communications network;
   a control unit inputting and outputting data with each storage device via the lower communications unit based on instructions input from the host device via the upper communications unit;
   a switching unit switching the connection destination of the lower communications unit between the lower communications network and the lower communications network of a partner controller;
   a fault detection unit detecting faults occurring in the lower communications network;
   a switching request unit outputting a switching request for inducing switching from the lower communications network, in which a fault is detected, to the lower communications network of the partner controller;
   a preparation status detection unit detecting whether or not switching preparations are complete; and
   a switching permission unit permitting switching with the switching unit based on the switching request when a preparation status detection unit detects that switching preparations have been completed and the switching request is received from the switching request unit;
   wherein switching to the lower communications network of the partner controller without completing the switching preparations will result in failure.

2. The storage control device according to claim 1, wherein the preparation status detection unit detects whether or not switching preparations are complete in the controller in which a fault is detected.

3. The storage control device according to claim 1, wherein the preparation status detection unit detects switching preparations as being complete in the controller in which a fault has been detected when initial setup for the lower communications network is completed.

4. The storage control device according to claim 1, wherein
   the controllers are mutually connected via a control communications path, and
   the preparation status detection unit detects, via the control communications path, whether or not switching preparations have been completed in the controller in which the fault is detected.

5. The storage control device according to claim 1, wherein
   the controllers write status notification information indicating that switching preparations have been completed to the prescribed storage device of the plurality of storage devices when the switching preparations are complete, and
   the preparation status detection unit, when acquired with the status notification information from the prescribed storage device, detects the completion of switching preparations.

6. The storage control device according to claim 1, further comprising a management computer connected to the controllers respectively via a management network, wherein
   each controller communicates status notification information indicating that switching preparations are complete via the management computer.

7. A path switching method for a storage control device duplicated with a plurality of controllers connected to a plurality of storage devices via differing lower communications networks, comprising the steps of:
   detecting whether or not a fault has occurred in a lower communications network;
   communicating, when a fault has been detected, from a switching source controller to a switching destination controller a switching request to induce switching from the lower communications network, in which the fault has been detected, to the lower communications network of the switching destination controller;
   detecting whether or not switching preparations are complete in the switching source controller, and, when completion of switching preparations is detected, communicating the completion of preparations to the switching destination controller; and
   inducing the lower communications network used by the switching source controller to switch from the lower communications network, in which the fault is detected, to the lower communications network of the switching destination controller, when both the switching request and preparation completion are communicated;
   wherein switching to the lower communications network of the switching destination controller without completing the switching preparations will result in failure.

8. A storage control device, comprising:
   a plurality of controllers connected to a plurality of storage devices via differing primary loops, wherein each primary loop is a storage control device mutually partnered with an alternate loop; and wherein
   (1) each controller comprises;
   an upper communications unit conducting communications with a host device;
   a lower communications unit conducting communications with each storage device via the primary loop;
   a control unit inputting and outputting data with each storage device via the lower communications unit based on instructions input from the host device via the upper communications unit;
   a switching unit switching the connection destination of the lower communications unit between the primary loop and the alternate loop;
   a fault detection unit detecting faults occurring in the primary loop; and
   a switching request signal output unit outputting a switching request signal for inducing switching from the primary loop in which a fault is detected to the alternate loop, when a fault is detected by the fault detection unit;
   (2) each controller comprises;
   a preparation status detection unit detecting, via a control communications path mutually connecting the control unit of each controller, whether or not the lower communications unit of the partner controller has completed initial setup, and outputting a preparations complete signal when initial setup has been completed; and
   an AND gate connected to the preparation status detection unit and the switching request signal output unit of the partner controller on the input side, and to the switching unit on the output side; and (3) the AND gate outputs a switching signal to the switching unit when a preparations complete signal and a switching request signal are input.

9. The storage control device according to claim 8, wherein
the switching request signal output unit normally sets the signal level of the switching request signal to low level, and when a fault is detected, changes the signal level of the switching request signal from low level to high level;
the preparation status detection unit normally sets the signal level of the preparation complete signal to low level, and when initial setup is completed, changes the signal level of the preparation complete signal from low level to high level; and
the AND gate outputs the switching signal to the switching unit when the preparation complete signal and the switching request signal change from low level to high level.

10. The path switch method according to claim 7, wherein completion of switching preparations is detected when initial setup for the lower communications network is completed for the switching source controller.

11. The path switch method according to claim 7, wherein
the controllers are mutually connected via a control communications path, and
detecting whether or not switching preparations are complete comprises detecting via the control communications path.

12. The path switch method according to claim 7, wherein a management computer is connected to the controllers respectively via a management network,
wherein the completion of switching preparations is communicated to the switching destination controller via the management computer.

13. The storage control device according to claim 8,
wherein switching to the lower communications network of the switching destination controller without completing the switching preparations will result in failure.

14. The storage control device according to claim 8, further comprising a management computer connected to the controllers respectively via a management network, wherein
each controller communicates status notification information indicating that switching preparations are complete via the management computer.

* * * * *